United States Patent
Omori et al.

(10) Patent No.: US 7,822,650 B2
(45) Date of Patent: Oct. 26, 2010

(54) PRODUCT SEARCH SYSTEM, PRODUCT SEARCH METHOD, AND PRODUCT SEARCH PROGRAM

(75) Inventors: Yusuke Omori, Tokyo (JP); Takashi Miyamoto, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/274,071

(22) Filed: Nov. 19, 2008

(65) Prior Publication Data

US 2009/0132388 A1    May 21, 2009

(30) Foreign Application Priority Data

Nov. 20, 2007   (JP)   ............... 2007-300490

(51) Int. Cl.
*G06Q 30/00* (2006.01)
(52) U.S. Cl. ...................................... 705/26
(58) Field of Classification Search ............ 705/26, 705/27
See application file for complete search history.

(56) References Cited

U.S. PATENT DOCUMENTS 6,366,910 B1 * 4/2002 Rajaraman et al. ............. 707/5
2008/0097975 A1 * 4/2008 Guay et al. ..................... 707/4
2008/0300967 A1 * 12/2008 Buckley et al. ............... 705/10

FOREIGN PATENT DOCUMENTS

JP          2002-92020 A       3/2002

* cited by examiner

*Primary Examiner*—Mila Airapetian
(74) *Attorney, Agent, or Firm*—Birch, Stewart, Kolasch & Birch, LLP (57) ABSTRACT

The present invention makes it possible to narrow down desired products comfortably and efficiently while comparing products and checking a combination of products for compatibility on an EC site. An EC site screen containing a list screen of a product group, fitting platform, keep box, and the like is displayed on a client terminal accessing the EC site. When a user drags and drops thumbnail images of one or more products of interest from the list screen to the keep box, information about the products is held in the keep box. To view detailed information including the held images of the products, the user drags and drops the thumbnail images from the keep box to the fitting platform. Mannequin images and are provided on the fitting platform, and the user can compare products and check a combination of the products for compatibility by placing the images of the products (apparel products) on the mannequin images.

13 Claims, 10 Drawing Sheets

PRODUCT SEARCH SYSTEM, PRODUCT SEARCH METHOD, AND PRODUCT SEARCH PROGRAM

BACKGROUND OF THE INVENTION

1. Field of the Invention

The present invention relates to a product search system, a product search method, and a product search program, and more particularly, to a technique for allowing a user to search for desired products via a network.

2. Description of the Related Art

Recently, electronic commerce (EC) businesses which sell products by allowing users to search for and select the products via the Internet have spread rapidly.

On the other hand, business categories in which Internet sales (use of EC) account for a larger share of total sales on the market are limited to those which can identify products by conventional text-based searches on personal computers, books, and the like. Thus, the use of electronic commerce is slow to spread in the fashion industry and the like in which appearance provides important clues in purchasing products.

Looking specifically at the fashion apparel industry, there are moves to provide various product search methods to the user including searches by brand, shape and type of clothing, color, and the like to make it easy to search for products.

Japanese Patent Application Laid-Open No. 2002-92020 discloses an Internet shopping system based on color search, where the Internet shopping system proposes a combination of color coordinated products and allows the user to change colors of products placed in a virtual space and search for and purchase products with changed colors.

Also, some recent EC sites are designed to display a list of products (with thumbnail images of the products) which match search conditions inputted by the user. Then, in response to a click on an image of a desired product, the sites transfer the user to a screen which displays an enlarged image and detailed information about the product. Furthermore, some EC sites have capabilities to display a list of a product group on a screen, allowing the user to put a check mark in front of products of interest, and display only the checked products together in response to a command to compare the products.

However, although the Internet shopping system disclosed in Japanese Patent Application Laid-Open No. 2002-92020 allows the user to search for products by color across different dealers and different product types, the color is merely one search condition. For example, when searching for products of the fashion apparel industry, it is not always possible for the user to find a desired product.

Also, when viewing detailed information about a product of interest by clicking the product on a list screen of a product group retrieved based on search conditions inputted on a client terminal on a known EC site, the user can view detailed information about only one product at a time and cannot obtain satisfactory information about products (e.g., apparel products) for which comparisons and combinations are important.

Furthermore, on a known EC site which allows the user to put a check mark in front of products of interest and displays only the checked products together in response to a command to compare the products, the use of the capabilities provided by the EC site will make it easy to compare products, but it is not possible to compare products which are not presented on the list screen of the product group from the beginning.

For example, if the user has found a product (autumn/winter top for ladies) she likes on a list screen of an apparel product group, but cannot find a product (autumn/winter bottom for ladies) the user wants to coordinate with, the user is supposed to input a search query ("ladies" "autumn/winter" "bottoms") and search again for a product (bottom) the user wants to coordinate with the product (top) she likes, on a list screen of a product group retrieved based on the search query. However, since the list screen is switched between the product groups, it is not possible to compare detailed information about the two products (top and bottom) including product images on the same screen.

SUMMARY OF THE INVENTION

The present invention has been made in view of the above circumstances, and an object of the present invention is to provide a product search system, product search method, and product search program which make it possible to search for products repeatedly and narrow down products comfortably and efficiently without providing wasteful processes such as screen reloading between searches for products and viewing of detailed information about the products.

To achieve the above object, according to a first aspect of the present invention, there is provided a product search system, comprising:

a client terminal, and a server connected to said client terminal via a network, wherein:

the server comprises:

a product retrieval device which retrieves a product group matching a search query received from the client terminal, and a first communications device which receives the search query from the client terminal and transmits product group information to the client terminal, the product group information being information about the retrieved product group and including images of individual products; and the client terminal comprises:

an input device used to input the search query on a display screen of the client terminal, a second communications device which receives the product group information from the server and transmits the search query inputted via the input device to said server, a list control device which displays a list screen of the product group including reduction images of the individual products in a first display area of the display screen based on the received product group information, a selection device used to select one or more desired products on the list screen and deselect a product from the selected products, an information holding device which holds information about the products selected via the selection device until the products are deselected by a user command, a view requesting device used to request to view detailed information about the products selected via the selection device, and a detailed-information display control device which displays detailed information held by the information holding device in a second display area of the display screen when there is a request from the view requesting device to view the detailed information about the products selected via the selection device, the detailed information including images of the products.

That is, based on the information about the product group retrieved using a search query, the list screen of the product group including reduction images of the individual products is displayed in the first display area of the display screen, allowing the user to select products of interest or deselect some of the selected products as appropriate. The information about the selected products is held until the products are deselected by a user command, but held even after another product group is retrieved based on an inputted new search query. Then, when there is a request to view detailed information about one or more products among the selected and held products, detailed information about the requested products including images of the products is displayed in the second display area of the display screen, allowing the user to view the detailed information about the products as well as compare and weigh the products in the second display area. This makes it possible to search for products repeatedly by eliminating wasteful processes such as screen reloading between selection of (searches for) products and viewing of detailed information about the products on the list screen.

According to a second aspect, in the product search system according to the first aspect, the detailed-information display control device displays the second display area over the first display area or temporarily removes the second display area in response to a user command to display or hide the second display area. The detailed information including images of the products is displayed in the second display area over the first display area. The second display area is superimposed over the first display area as required (e.g., when the user wants to view the detailed information about the products or compare and weigh the products). The user can navigate between the first and second display areas without reloading the screen.

According to a third aspect, in the product search system according to the second aspect, the detailed-information display control device temporarily removes the second display area from the first display area when a search query is inputted via the input device. This makes it possible to search for products and view detailed information about the products successively.

According to a fourth aspect, in the product search system according to the second or third aspect, the detailed-information display control device expands or reduces the second display area in response to a user command to expand or reduce the second display area. That is, when the second display area is expanded, the user can check details of product images easily. On the other hand, when the second display area is reduced so that the first display area can be checked visually, the user can search for other products with detailed information about products being displayed. If the image list displayed in the first display area is made scrollable, it is possible to display images of a larger number of product groups without being obstructed by the second display area and the like.

According to a fifth aspect, in the product search system according to any of the first to fourth aspects, the client terminal further comprises a selected-image display control device which displays the reduction images of the products selected via the selection device in a third display area of the display screen; and the selection device selects the one or more desired products by dragging and dropping reduction images displayed in the list screen from the first display area to the third display area. Consequently, the user can select products intuitively using a mouse in much the same way as when putting products of interest temporarily in the user's shopping cart.

According to a sixth aspect, in the product search system according to the fifth aspect, the selection device deselects a product from the selected products by dragging and dropping the reduction image of the product from the third display area to the first display area. Consequently, the user can deselect products intuitively using a mouse in much the same way as when returning products from the user's shopping cart.

According to a seventh aspect, in the product search system according to the fifth or sixth aspect, the view requesting device requests to view the detailed information about the products selected via the selection device, by dragging and dropping the reduction images of the selected products from the third display area to the second display area.

According to an eighth aspect, in the product search system according to any of the fifth to seventh aspects, the input device comprises a fourth display area used to input a search query in the display screen of the client terminal; and to input the search query, an image displayed on the first display area, the second display area, or the third display area is selected and dragged and dropped to the fourth display area.

This allows the user to input a search query using the mouse, eliminating the need to type keywords for the search query. Incidentally, in addition to a search query using an image, another search query may be used to narrow down the products.

According to a ninth aspect, in the product search system according to any of the first to eighth aspects, the products searched for include products used in a combination of two or more. This is useful in checking products for compatibility by displaying the products in combination.

According to a tenth aspect, in the product search system according to any of the first to ninth aspects, in response to a user command to move the images of products, the detailed-information display control device can move the images of two or more products displayed in the second display area to any position in the second display area so that the two or more products will be checked for compatibility when combined.

This makes it possible to adjust arrangement of images of multiple products, making it easy to check a combination of two or more products for compatibility.

According to an eleventh aspect, in the product search system according to any of the first to ninth aspects, the products searched for are worn on the body; and the detailed-information display control device displays a mannequin image in the second display area and, in response to a user command to move the images of products, moves the images of two or more products displayed in the second display area onto the mannequin image so that the two or more products will be checked for compatibility when combined.

If products worn on the body such as clothes, a handbag, shoes, and a hat are displayed over a mannequin image, it is possible to check a combination of two or more products for compatibility.

According to a twelfth aspect of the present invention, in a system in which a client terminal that searches for products and a server that provides information about the products are connected via a network, there is provided a product search method for searching for a desired product by manipulating a client terminal, the method comprising the steps of: inputting a search query used to search for products, on a display screen of the client terminal; transmitting the inputted query to the server; receiving information about a product group retrieved by the server based on the transmitted search query; displaying a list screen of the product group including thumbnail images of individual products in a first display area of the display screen based on the received product group information; specifying and selecting one or more desired products on the list screen; holding information about the products selected via the selection device until the products are deselected by a user command; requesting to view detailed information about the selected products; and displaying detailed information including the held images of the products in a second display area of the display screen when there is a request to view the detailed information about the selected products, wherein searches can be carried out repeatedly without reloading the screen at the time of switching between selection of the products and viewing of the detailed information about the products.

According to a thirteenth aspect of the present invention, there is provided a product search program which makes a client terminal perform the functions of: accepting input of a search query used to search for products, on a display screen of the client terminal; transmitting the accepted query to a server; receiving information about a product group retrieved by the server based on the transmitted search query; displaying a list screen of the product group including thumbnail images of individual products in a first display area of the display screen based on the received product group information; allowing one or more desired products to be selected on the list screen; holding information about the products selected via the selection device until the products are deselected by a user command; requesting to view detailed information about the selected products; and displaying detailed information including the held images of the products in a second display area of the display screen when there is a request to view the detailed information about the selected products.

According to the present invention, when the user selects products of interest on the list screen of the product group retrieved based on a search query, information about the selected products is held until the products are deselected by a user command. On the other hand, when there is a request to view detailed information about one or more of the held products, the detailed information including the images of the products are displayed on the display screen. This allows the user to view the detailed information about products of interest as well as compare and weigh multiple products. This makes it possible to search for products repeatedly by eliminating wasteful processes such as screen reloading between selection of (searches for) products and viewing of detailed information about the products on the list screen. This is useful especially in comparing products and checking a combination of products for compatibility.

DETAILED DESCRIPTION OF THE PREFERRED EMBODIMENTS

Preferred embodiments of a product search system, product search method, and product search program according to the present invention will be described below with reference to the drawings.

[System Configuration]

Figure 1:
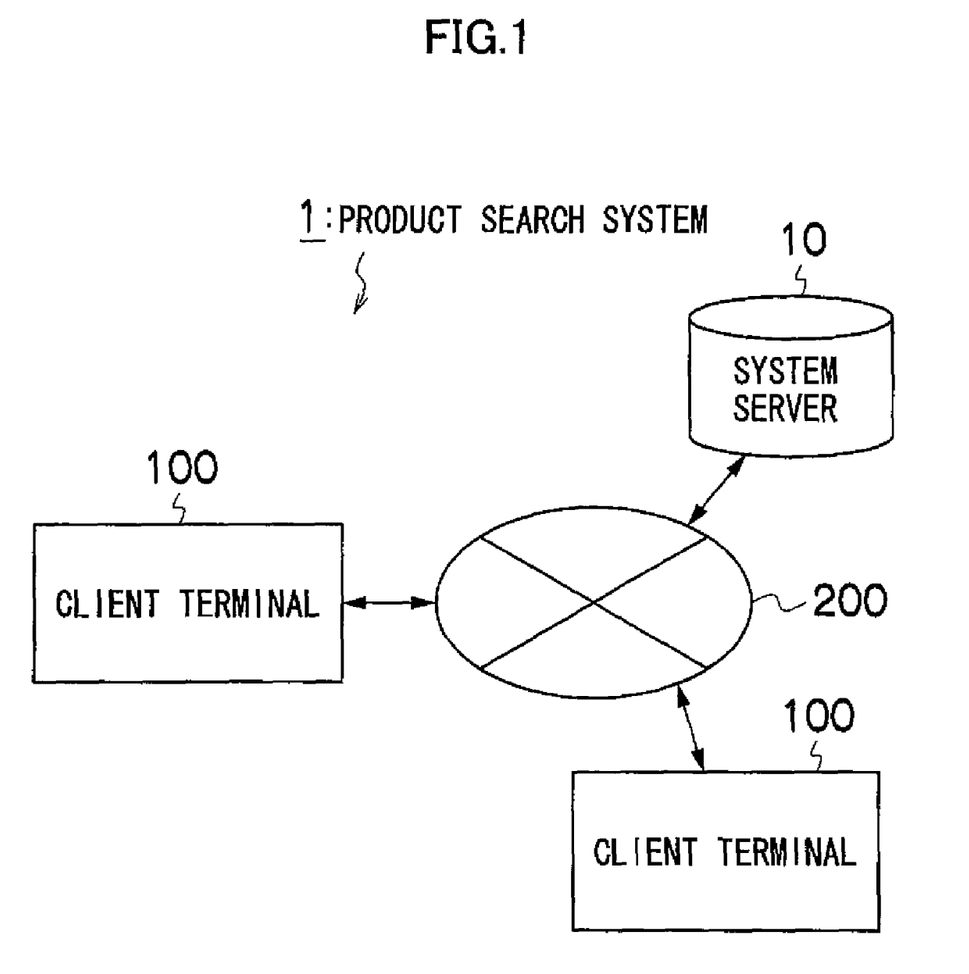
FIG. 1 is a schematic diagram of a product sales network system resulting from application of a product search system according to the present invention.

FIG. 1 is a schematic diagram of a product sales network system resulting from application of a product search system according to the present invention.

As shown in FIG. 1, the product search system 1 mainly includes a system server 10 which provides information about products and the like and client terminals 100 which are operated by general users, where the system server 10 and client terminals 100 are connected via the Internet 200.

<System Server>

Figure 2:
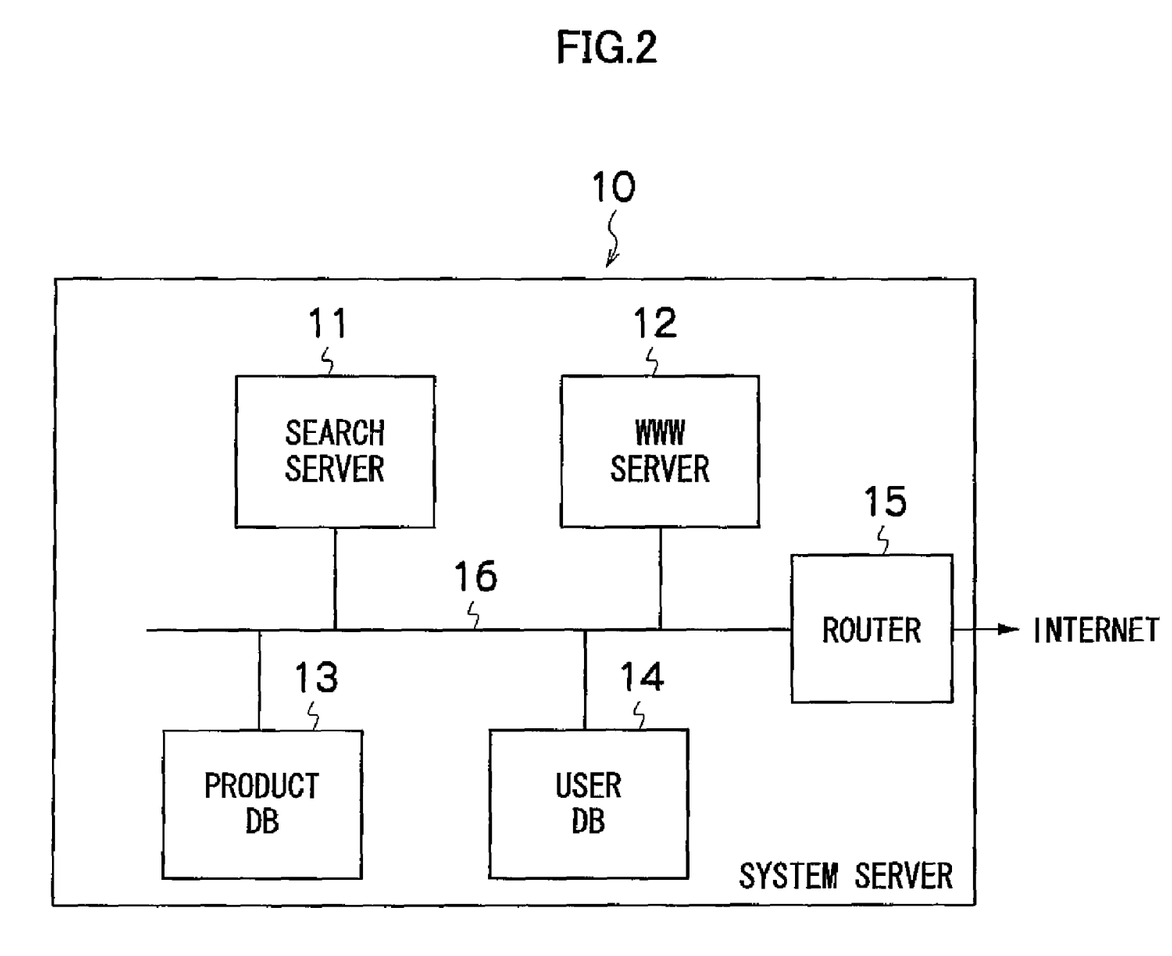
FIG. 2 is a block diagram schematically showing a system server of the product search system.

FIG. 2 is a block diagram schematically showing the system server 10 of the product search system 1.

As shown in FIG. 2, the system server 10 mainly includes a search server 11, WWW (World Wide Web) server 12, product database (DB) 13, user DB 14, and router 15. The servers and databases are interconnected via a LAN 16 in such a way as to be able to communicate with one another and connected to the Internet 200 via a router 15.

The product DB 13 manages all products to be searched for by the present system. According to the present embodiment, products worn on the body such as clothes, handbags, shoes, and hats are handled. The product DB 13 manages all the products handled by the present system using identification information about the products (product ID, (product name)). Information about each product managed by the product ID includes images (image proper and thumbnail image) of the product as well as information which represents features of the product such as the color, pattern, shape, and type of the product. Besides, the product ID manages the price, size, manufacturer name, and brand name of each product.

Based on a search query received from a client terminal 100, the search server 11 retrieves a product group which matches the search query from the product DB 13 and passes information about the retrieved product group to the WWW server 12. For example, when the product ID of a product is received as a search query, the search server 11 retrieves, from the product DB 13, a product group of colors, patterns, shapes, or types identical or similar to those represented by the product ID. Details of product search will be described later.

The WWW server 12, which collaborates with the search server 11, provides the client terminal 100 with a Web site (EC site) which contains information about the product group retrieved by the search server 11 based on the search query received from the client terminal 100.

The user DB 14 manages personal information (address, name, telephone number, e-mail address, user ID, password, etc.) of the users who use the present system. When an order on products retrieved by the present system is accepted, the personal information is used for account settlement and delivery of the products.

<Client Terminal>

Figure 3:
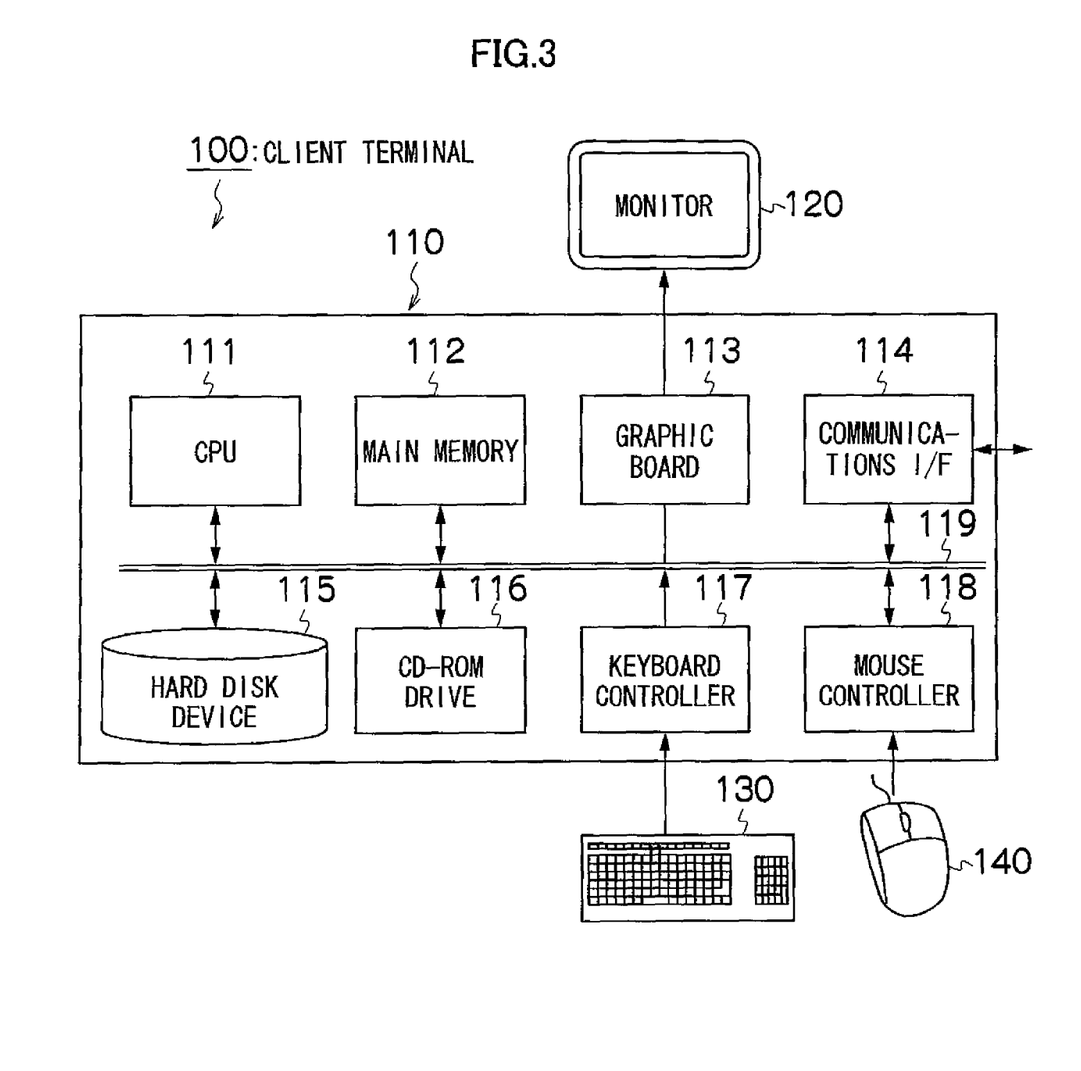
FIG. 3 is a diagram showing a hardware configuration of a client terminal.

FIG. 3 is a diagram showing a hardware configuration of the client terminal.

As shown in FIG. 3, the client terminal 100, which is a personal computer (PC), includes a client terminal's body 110, a monitor 120 such as a liquid crystal display or CRT display, and input devices such as a keyboard 130 and mouse 140.

The client terminal's body 110 mainly includes a central processing unit (CPU) 111 which controls operation of components; a main memory 112 which stores an apparatus control program and provides a working area during program execution; a graphic board 113 which controls display on the monitor 120; a communications interface (communications I/F) 114 connected to the Internet 200; a hard disk device 115 which stores an operating system (OS) of the personal computer, device drivers for peripheral devices connected to the personal computer, various software including a WWW browser, and the like; a CD-ROM drive 116; a keyboard controller 117 which detects keystrokes on the keyboard 130 and outputs the detected keystrokes as a user command to the CPU 111; and a mouse controller 118 which detects a state of the mouse 140 serving as a position input device and outputs signals about position of a mouse pointer on the monitor 120 and the state of the mouse 140 to the CPU 111.

[Product Search Method]

Figure 4:
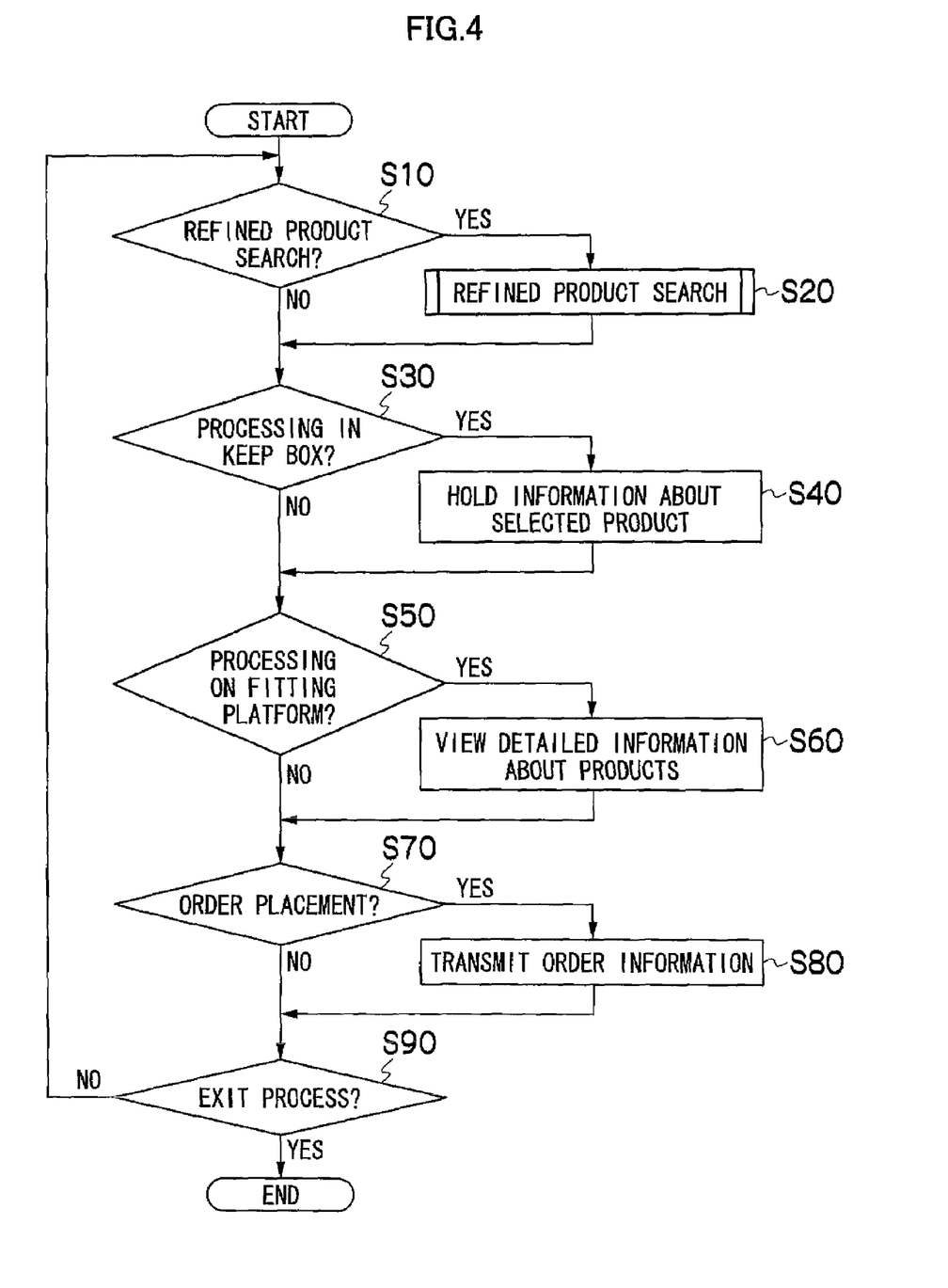
FIG. 4 is a flowchart showing an embodiment of a product search method according to the present invention.

FIG. 4 is a flowchart showing an embodiment of the product search method according to the present invention. FIGS. 6 to 9 are EC site screens displayed on the monitor 120 of the client terminal 100.

When searching for a desired product, the user starts the WWW browser on the client terminal 100, accesses an EC site provided by the system server 10, and downloads Web content and Web applications from the system server 10. The client terminal 100 displays an EC site screen on the monitor 120 and carries out product searches using an application running on the WWW browser.

Figure 6:
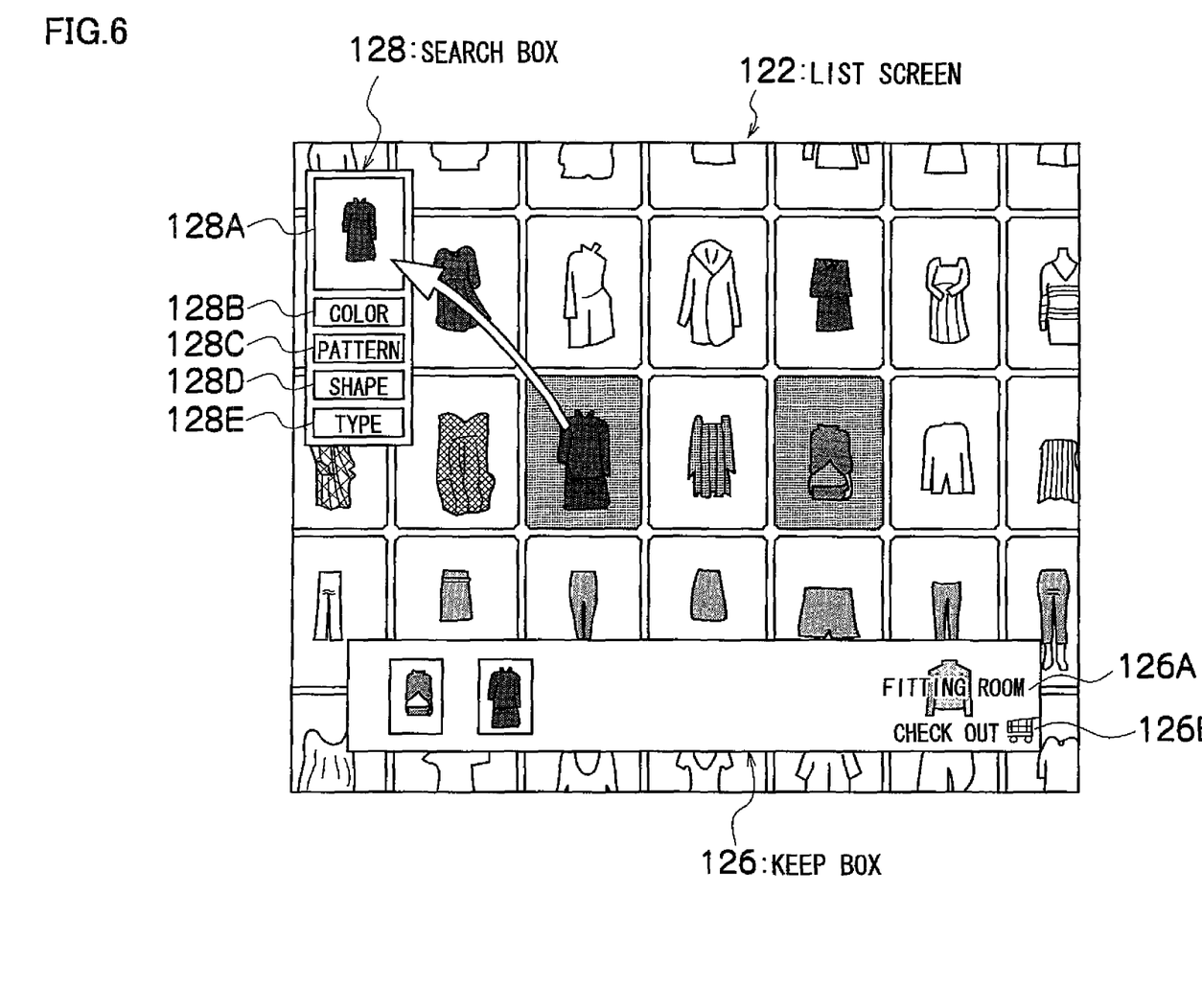
FIG. 6 is a diagram of an EC site screen displayed on a monitor of the client terminal and shows how a search query is inputted from a list screen.

FIG. 6 shows an EC site screen, which is displayed when the user clicks a top page of the EC site or clicks an icon button such as "Women's" or "Men's" on the top page.

A list screen 122 is displayed in the EC site screen, listing thumbnail images of a product group in a display area (tentatively referred to as a "field") of the entire screen. It is preferable to list products in fashion, seasonable products, recommended products, or the like on the list screen 122 by representing the shop's product lineup to make it easier for the user to understand products.

Also, the list screen 122 may be designed to automatically scroll (left to right in FIG. 6) slowly to show the user a larger number of products. Alternatively, horizontal and vertical scroll bars may be provided to allow the user to view additional products that do not fit in the field by scrolling through the list using the horizontal or vertical scroll bar. Furthermore new products (NEW) and recommended products may be surrounded by color frames so that the products will stand out.

With the list screen 122 of products displayed as described above, the user starts a product search.

In FIG. 4, the flow branches depending on whether the user carries out a refined product search (Step S10). If a refined product search is carried out (YES in Step S10), the flow goes to Step S20.

<Refined Product Search>

Figure 5:
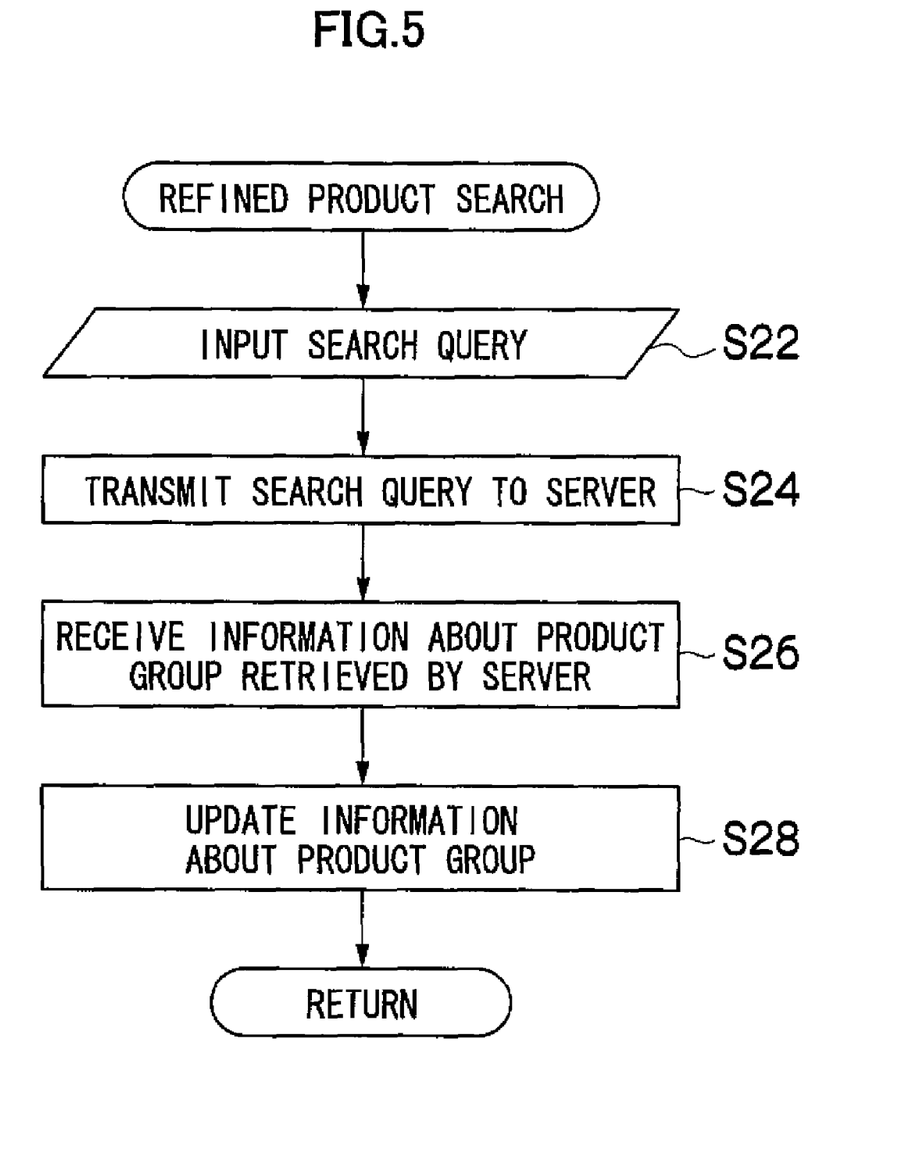
FIG. 5 is a flowchart showing procedures for a refined product search.

FIG. 5 is a flowchart showing procedures for a refined product search carried out in Step S20.

As shown in FIG. 5, when carrying out a refined product search, the user inputs a search query (Step S22). The search query is inputted using a search box 128 shown in FIG. 6.

The search box 128 is displayed in the field (list screen 122) as a display area used to input a search query. The search box 128 can be moved to any position using the mouse 140. The search box 128 contains an area 128A to which a thumbnail image of a product is dragged and dropped, a "Color" button 128B used to select a color, a "Pattern" button 128C used to select a pattern, a "Shape" button 128D used to select a shape, and a "Type" button 128E used to select a type.

A search query is inputted as follows using the search box 128. The user selects one of the thumbnail images of products displayed in the list screen 122 and drags and drops the selected thumbnail image to the area 128A of the search box 128 using the mouse 140.

When the thumbnail image of the product is dragged and dropped successfully, the search box 128 displays a reduced image by further scaling down the thumbnail image. Also, information which represents the product (product ID of the product) is inputted. Next, when the user clicks the "Color" button 128B, "Pattern" button 128C, "Shape" button 128D, or "Type" button 128E, information related to the clicked button is inputted.

Consequently, the product ID of the desired product and a condition for the refined search are inputted as a search query, where the condition for the refined search is constituted of information about the "color," "pattern," "shape," or "type" of the product.

Returning to FIG. 5, the search query thus inputted is transmitted from the client terminal 100 to the system server 10 (Step S24).

Upon receiving the search query, the system server 10 (search server 11) retrieves a product group which matches the received search query from the product DB 13 and passes information about the retrieved product group to the WWW server 12 in the manner described above. When the product ID of a product A and information about the product's "color" are received as a search query, a product group identical or similar in color to product A is retrieved from the product DB 13 and information about the product group is transmitted to the client terminal 100 which has transmitted the search query.

The client terminal 100 receives the information about the product group retrieved by the system server 10 (Step S26) as described above, updates the product group, and updates the list screen displayed on the monitor 120 (Step S28).

<Processing in a Keep Box>

In FIG. 4, if a refined product search is not carried out (NO in Step S10) or when the refined product search is finished in Step S20, the flow goes to Step S30.

Figure 7:
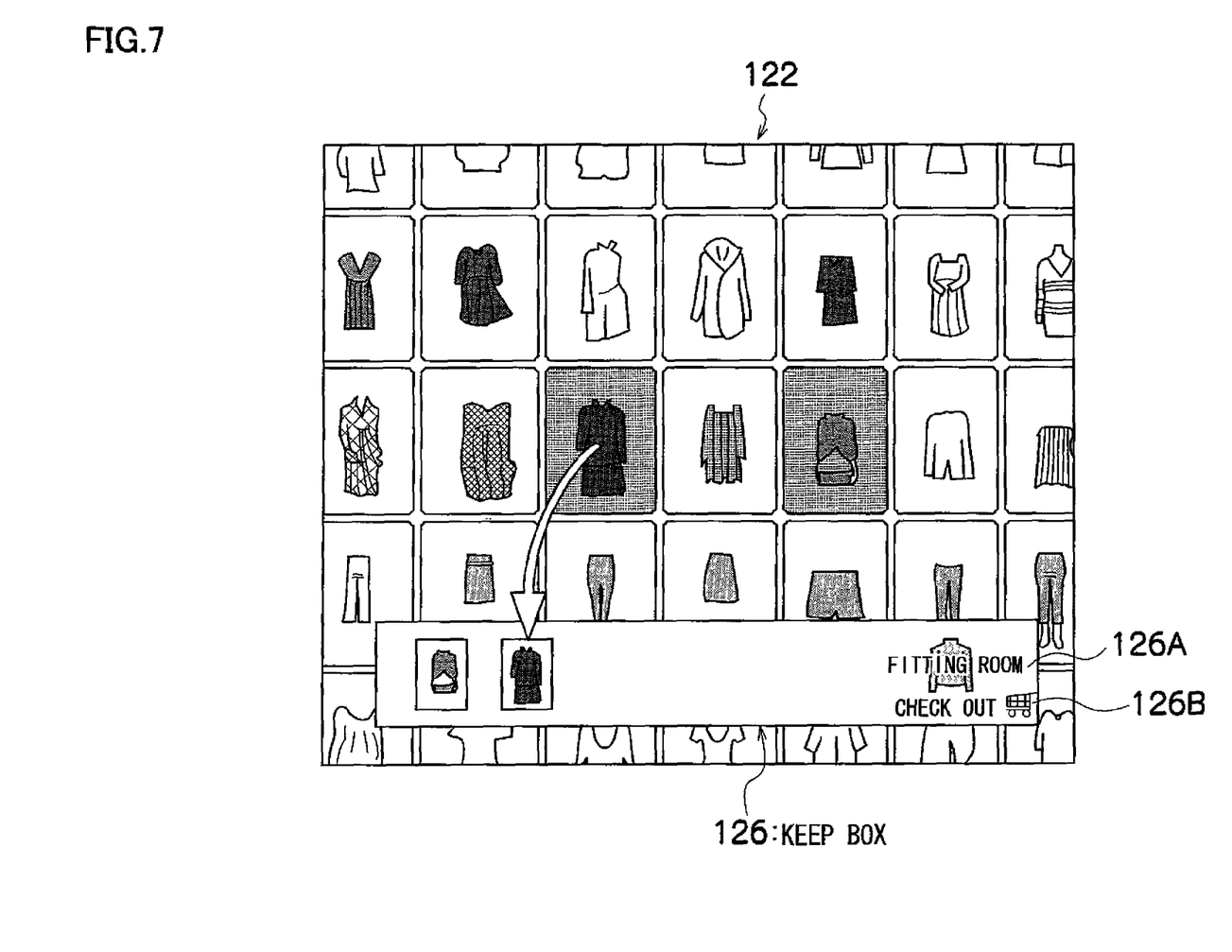
FIG. 7 is a diagram of the EC site screen displayed on the monitor of the client terminal and shows how a product is selected from the list screen.

In Step S30, the flow branches depending on whether or not processing in a keep box 126 shown in FIG. 7 is carried out. If the processing in the keep box 126 is carried out, the flow goes to Step S40. Incidentally, the keep box 126 is a predetermined display area displayed in the field (list screen 122).

In Step S40, the user causes the selected product (product of interest) to be held temporarily, makes a request to view detailed information about the held product, and places an order on the product.

That is, as shown in FIG. 7, the keep box 126 has a display area which displays thumbnail images and which contains a "Fitting Room" button 126A and "Check Out" button 126B.

When the user selects a product of interest in the list screen 122 and drags and drops the thumbnail image of the product to the display area in the keep box 126 using the mouse 140, the thumbnail image of the product (the thumbnail image smaller than the thumbnail image in the list screen 122) is displayed in the keep box 126 and information about the product is held in a predetermined storage area (e.g., a temporary storage area provided in the main memory 112) of the client terminal 100.

That is, the user can hold a product of interest by dragging and dropping it with a mouse in much the same way as when putting a product of interest in the user's shopping cart. Incidentally, thumbnail images in the list screen 122 have their background color changed when they are held in the keep box 126, to allow the user to see that they are held in the keep box 126. Also, when the thumbnail image of a product held in the keep box 126 is dragged and dropped to the display area of the list screen 122 with a mouse 140, the thumbnail image of the product is erased from the keep box 126 and the information about the product is erased from the temporary storage area.

By clicking the "Fitting Room" button 126A in the keep box 126, the user can invoke a fitting platform 124 (see FIGS. 8 and 9) to view detailed information about the products held in the keep box 126. The fitting platform 124 is displayed over the list screen 122. The user can temporarily remove the fitting platform 124 from the list screen 122 by clicking the "Fitting Room" button 126A again. Furthermore, by clicking the "Check Out" button 126B in the keep box 126, the user can go to the process of buying the products held in the keep box 126.

Incidentally, the keep box 126 can be moved to any position by dragging with the mouse 140.

<Processing on the Fitting Platform>

In FIG. 4, if the processing in the keep box 126 is not carried out (NO in Step S30) or the information held in Step S40 is released, the flow goes to Step S50.

Figure 8:
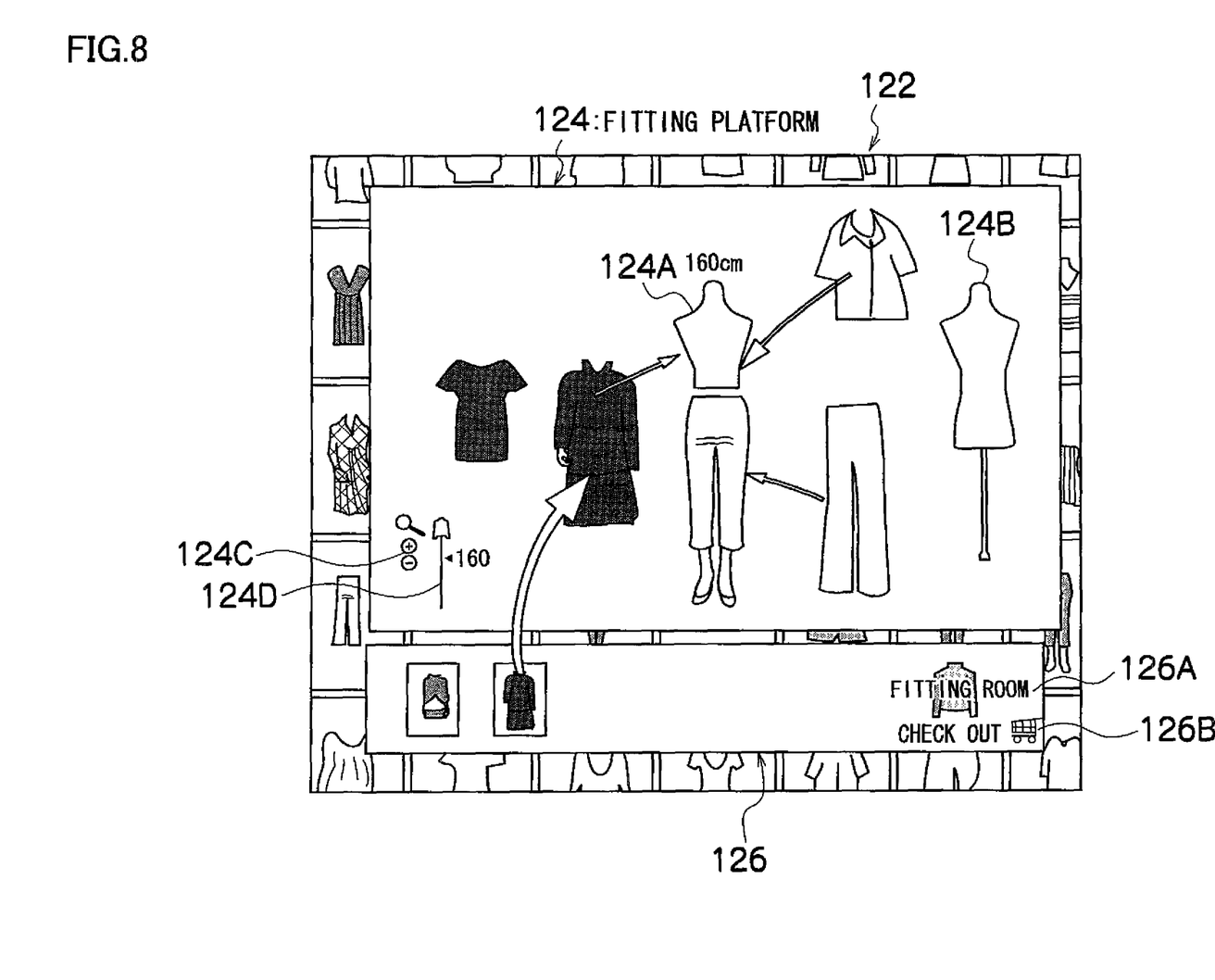
FIG. 8 is a diagram of the EC site screen displayed on the monitor of the client terminal and shows how detailed information about a product is displayed on a fitting platform.

In Step S50, the flow branches depending on whether or not processing on the fitting platform 124 shown in FIG. 8 is carried out. If the processing on the fitting platform 124 is carried out, the flow goes to Step S60.

In Step S60, the user views the detailed information about the products held in the keep box 126 and compares and weighs a plurality of products.

As described above, when the user clicks the "Fitting Room" button 126A in the keep box 126, the fitting platform 124 used to view the detailed information about the products held in the keep box 126 is invoked and displayed over the list screen 122 as shown in FIG. 8.

The fitting platform 124 has a display area which can be displayed in the field (list screen 122). In the display area, there are mannequin images 124A and 124B, zoom buttons 124C used to zoom in and out on the screen, and a scale bar 124D used to change size (height) of the mannequin images 124A and 124B.

First, the user displays the fitting platform 124 in the field and adjusts the height of the mannequin images 124A and 124B to the height of the user using the scale bar 124D. Next, the user drags and drops the thumbnail image of a product from the keep box 126 to the fitting platform 124 with the mouse 140. This makes it possible to display the image (image proper) of the product on the fitting platform 124. Incidentally, in addition to the image of the product, information (price, size, manufacture name) and the like attached to the product may be displayed near the product.

Also, the zoom buttons 124C allow the user to zoom in and out on the fitting platform 124, making it possible to check details of the product.

The image of the product on the fitting platform 124 can be moved to any position on the fitting platform 124 using the mouse 140. For example, the image can be moved onto the mannequin image 124A or 124B.

Size of the product image displayed on the fitting platform 124 is adjusted to size of the fitting platform 124. For example, if a zoom factor of the fitting platform 124 is 100%, a zoom factor of the product image is set to 100%. The size of product images needs to be standardized so that the image of each product, when displayed on the fitting platform 124, corresponds to the actual size of the product. For example, the height of the mannequin in FIG. 8 is set to 160 cm, and image size of products has to be standardized so that the image of a product suited to the mannequin in terms of size will fit the mannequin image when moved onto the mannequin image.

Also, an automatic position adjustment function may be provided to automatically place the image of a product at an optimal position on the mannequin image when the image of the product is moved and dropped near a predetermined position of the mannequin image 124A. This will make it easy to move the image of a product onto the mannequin image.

The use of the fitting platform 124 makes it possible to check a combination of two or more products (e.g., a top and bottom) for compatibility by putting the products on the mannequin.

On the other hand, after checking the detailed information about the product on the fitting platform 124, if the user is not satisfied with the selected product (if the user is going to select another product), the user temporarily removes the fitting platform 124 from the field (list screen 122) by clicking the "Fitting Room" button 126A in the keep box 126. This makes it possible to return to the state shown in FIG. 7 and select and store a new product in the keep box 126. Incidentally, a "Minimize" button may be provided on the fitting platform 124 to allow the user to temporarily remove the fitting platform 124 by clicking the "Minimize" button instead of the "Fitting Room" button 126A. Alternatively, the user may minimize the fitting platform 124 using the zoom buttons 124C provided on the fitting platform 124 or temporarily remove the fitting platform 124 from the field by dragging it with the mouse 140.

If the user cannot find a product the user likes on the list screen 122, the user updates the list screen 122 by carrying out a refined product search as shown in FIG. 6. In that case, although the list screen 122 is updated, the product information held in the keep box 126 can be preserved intact.

Figure 9:
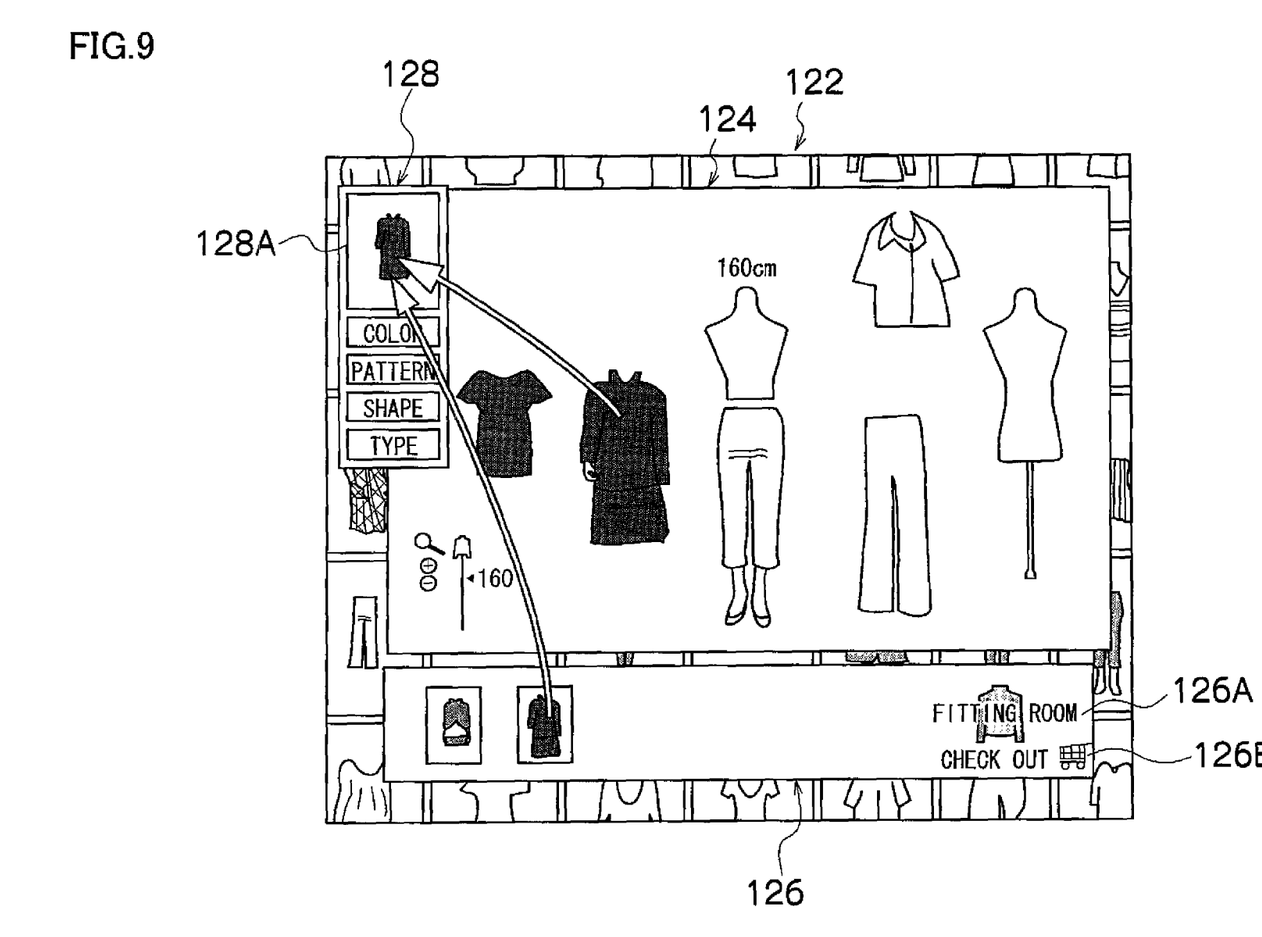
FIG. 9 is a diagram of the EC site screen displayed on the monitor of the client terminal and shows how a search query is inputted from the fitting platform or a keep box.

The user can also carry out the refined product search by dragging and dropping the product image from the fitting platform 124 to the area 128A of the search box 128 as shown in FIG. 9. Incidentally, when the user orders a refined product search by dragging and dropping the product image from the fitting platform 124 to the area 128A of the search box 128, the fitting platform 124 is automatically minimized, allowing the user to check the list screen 122 which reflects results of the refined product search.

Also, a refined product search can be carried out by dragging and dropping the thumbnail image of a product from the keep box 126 to the area 128A of the search box 128.

<Order Placement>

In FIG. 4, if the processing on the fitting platform 124 is not carried out (NO in Step S50) or if the user finishes viewing the detailed information in Step S60, the flow goes to Step S70.

In Step S70, when the user clicks the "Check Out" button 126B in the keep box 126, the user is transferred to Step S80 to buy the products held in the keep box 126 as described with reference to FIG. 6 and the like.

In Step S80 the user is transferred to an order placement screen, for example, to input order information. On the order placement screen, the user checks the products to be ordered. Also, if the user has a user ID and password, the user inputs the user ID and the like. On the other hand, in the case of a new users the user inputs personal information and the like. Then, as the user clicks a Confirm Order button, the order information including the product IDs of the products held in the keep box 126 is transmitted to the system server 10.

The above processes are performed until an exit process is performed to close the EC site (Step S90)

[Flow of a Product Search Operation]

Figure 10:
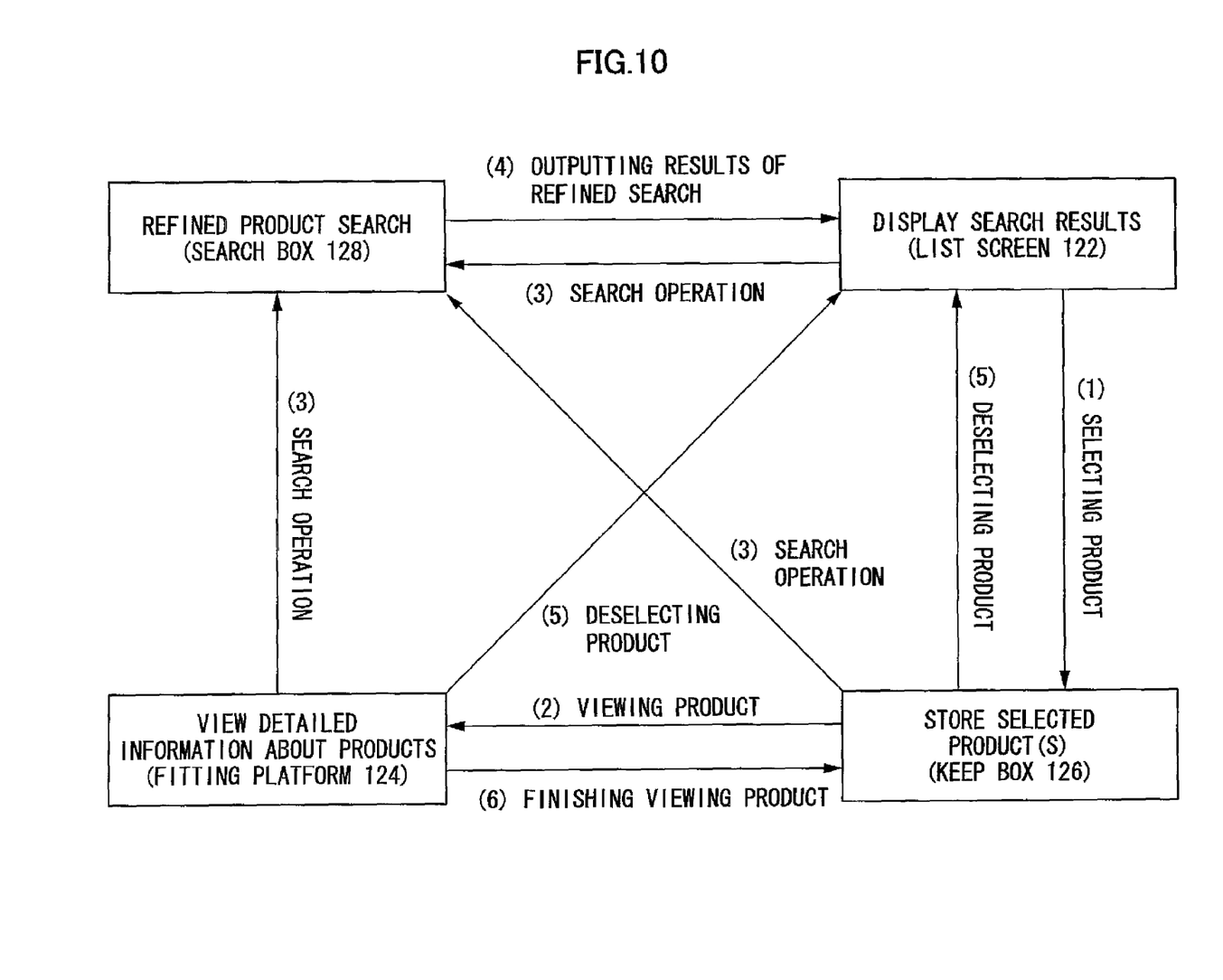
FIG. 10 is a diagram showing a flow of a product search operation performed on the EC site screen.

FIG. 10 is a diagram showing a flow of a product search operation performed on the EC site screen.

As shown in FIG. 9, the EC site screen displays the list screen 122, fitting platform 124, keep box 126, and search box 128, where the list screen 122 displays thumbnail images of a product group.

The EC site screen allows the user to search for desired products by dragging and dropping the images of the products or clicking buttons without moving from screen to screen.

(1) Selecting a Product

When the user drags and drops a thumbnail image of a product to the keep box 126 by selecting it from among thumbnail images of a product group retrieved as a result of a refined product search and displayed on the list screen 122, information about the product is held (stored) in the keep box 126 (see FIG. 7).

(2) Viewing a Product

By dragging and dropping the thumbnail image of a product held in the keep box 126 to the fitting platform 124, the user views detailed information about the product, compares the product with another product, and checks a combination of the product with the other product for compatibility (see FIG. 8).

(3) Search Operation

The user drags and drops a thumbnail image displayed on the list screen 122, product image displayed on the fitting platform 124, or thumbnail image displayed in the keep box 126 to the search box 128, thereby inputs a search query, and thereby carries out a refined search (see FIGS. 6 and 9).

(4) Outputting Results of the Refined Search

Information about a product group (search results) retrieved by the system server 10 as a result of the refined search are received and outputted (listed).

(5) Deselecting a Product

The user drags and drops a product image displayed on the fitting platform 124 or thumbnail image displayed in the keep box 126 to the list screen 122 and thereby deletes the product information (deselects the product) held in the keep box 126.

(6) Finishing Viewing a Product

The user drags and drops a product image displayed on the fitting platform 124 to the keep box 126 and thereby deletes the product image displayed on the fitting platform 124 (finishes viewing the product). Incidentally, information about the product is retained.

By repeating the above processes on the same screen without navigating among screens (screen reloading), the user can carry out searches for desired products comfortably and efficiently while comparing products and checking a combination of products for compatibility.

Other Embodiments

A recommended product related to a product may be proposed when the user drags the thumbnail image of the product from the keep box 126 to the fitting platform 124 or drops an image of the product on a mannequin image. Regarding a method for proposing a recommended product, a "recommended-product display area" containing thumbnail images of one or more recommended products is displayed near the fitting platform 124. The user is allowed to check detailed information about the recommended product by dragging a thumbnail image from the "recommended-product display area" to the fitting platform 124. Also, when the thumbnail image of a recommended product is dragged and dropped to the fitting platform 124, information about the recommended product may be held in the keep box 126. Incidentally, a recommended product related to a product can be proposed if a product ID of the recommended product is attached to the product as information about the product.

Also, although according to the above embodiment, the client terminal carries out product searches using a WWW browser, the product search process according to the present invention may be carried out using special-purpose software downloaded from the system server 10 in advance.

Furthermore, configurations of the product group list screen, fitting platform, keep box, and search box are not limited to those according to the above embodiment, and various other configurations are possible. The search box and keep box may be fixed at predetermined positions so as not to overlap the list screen.

Information about a product may be held in the keep box and detailed information about the product may be displayed on the fitting platform when, for example, the thumbnail image of the product on the list screen is double-clicked. In that case, a single double-click issues a selection command to hold product information and a view request for the selected product.

Also, although the above embodiment has been described by citing products worn on the body such as apparel products, products to be searched for according to the present invention is not limited to this. The present invention is particularly useful in product searches (for products such as apparel products, furniture, and interior products) which involve comparing products and checking a combination of products for compatibility.

The present invention is not limited to the above examples and, needless to say, various changes and modifications may be made without departing from the spirit and scope of the present invention.

What is claimed is:

1. A product search system, comprising:
   a client terminal, and
   a server connected to said client terminal via a network, wherein:
   the server comprises:
      a product retrieval device which retrieves a product group matching a search query received from the client terminal, and
      a first communications device which receives the search query from the client terminal and transmits product group information to the client terminal, the product group information being information about the retrieved product group and including images of individual products; and
   the client terminal comprises:
      an input device used to input the search query on a display screen of the client terminal,
      a second communications device which receives the product group information from the server and transmits the search query inputted via the input device to said server, a list control device which displays a list screen of the product group including reduction images of the individual products in a first display area of the display screen based on the received product group information, a selection device used to select one or more desired products on the list screen and deselect a product from the selected products, an information holding device which holds information about the products selected via the selection device until the products are deselected by a user command, and which also holds the information after the information of the product group newly retrieved by the server has been received based on the search query newly inputted by the input device, a selected-image display control device which displays the reduction images of the products selected via the selection device in a third display area of the display screen, a view requesting device used to request to view detailed information about the products selected via the selection device, and a detailed-information display control device which displays detailed information held by the information holding device in a second display area of the display screen when there is a request from the view requesting device to view the detailed information about the products selected via the selection device, the detailed information including images of the products.

2. The product search system according to claim 1, wherein the detailed-information display control device displays the second display area over the first display area or temporarily removes the second display area in response to a user command to display or hide the second display area.

3. The product search system according to claim 2, wherein the detailed-information display control device temporarily removes the second display area from the first display area when a search query is inputted via the input device.

4. The product search system according to claim 2, wherein the detailed-information display control device expands or reduces the second display area in response to a user command to expand or reduce the second display area.

5. The product search system according to claim 1, wherein:

the selection device selects the one or more desired products by dragging and dropping reduction images displayed in the list screen from the first display area to the third display area.

6. The product search system according to claim 5, wherein the selection device deselects a product from the selected products by dragging and dropping the reduction image of the product from the third display area to the first display area.

7. The product search system according to claim 5, wherein the view requesting device requests to view the detailed information about the products selected via the selection device, by dragging and dropping the reduction images of the selected products from the third display area to the second display area.

8. The product search system according to claim 5, wherein:

the input device comprises a fourth display area used to input a search query in the display screen of the client terminal; and to input the search query, an image displayed on the first display area, the second display area, or the third display area is selected and dragged and dropped to the fourth display area.

9. The product search system according to claim 1, wherein products searched for include products used in a combination of two or more.

10. The product search system according to claim 1, wherein in response to a user command to move the images of products, the detailed-information display control device can move the images of two or more products displayed in the second display area to any position in the second display area so that the two or more products will be checked for compatibility when combined.

11. The product search system according to claim 1, wherein:

the products searched for are worn on the body; and the detailed-information display control device displays a mannequin image in the second display area and, in response to a user command to move the images of products, moves the images of two or more products displayed in the second display area onto the mannequin image so that the two or more products will be checked for compatibility when combined.

12. In a system in which a client terminal that searches for products and a server that provides information about the products are connected via a network, a product search method for searching for a desired product by manipulating a client terminal, the method comprising the steps of:

inputting a search query used to search for products, on a display screen of the client terminal;

transmitting the inputted query to the server;

receiving information about a product group retrieved by the server based on the transmitted search query;

displaying a list screen of the product group including reduction images of individual products in a first display area of the display screen based on the received product group information;

specifying and selecting one or more desired products on the list screen;

holding information about the products selected via the selection device until the products are deselected by a user command and also holding information after the information of the product group newly retrieved by the server has been received based on the search query newly inputted by the input step;

displaying reduction images of the products selected in a third display area of the display screen;

requesting to view detailed information about the selected products; and displaying detailed information including the held images of the products in a second display area of the display screen when there is a request to view the detailed information about the selected products, wherein searches can be carried out repeatedly without reloading the screen at the time of switching between selection of the products and viewing of the detailed information about the products.

13. A programmable storage medium tangibly embodying a program of machine-readable instructions executable by a client terminal to perform a product search method, said method comprising:

accepting input of a search query used to search for products, on a display screen of the client terminal;

transmitting the accepted query to a server;

receiving information about a product group retrieved by the server based on the transmitted search query;

displaying a list screen of the product group including reduction images of individual products in a first display area of the display screen based on the received product group information;

allowing one or more desired products to be selected on the list screen;

holding information about the products selected via the selection device until the products are deselected by a user command and also holding information after the information of the product group newly retrieved by the server has been received based on the search query newly inputted by the input step;

displaying reduction images of the products selected in a third display area of the display screen;

requesting to view detailed information about the selected products; and displaying detailed information including the held images of the products in a second display area of the display screen when there is a request to view the detailed information about the selected products.

* * * * *